United States Patent
Mazzouji et al.

(10) Patent No.: US 8,491,255 B2
(45) Date of Patent: Jul. 23, 2013

(54) PELTON HYDRAULIC MACHINE INCLUDING MEANS FOR INJECTING A FLOW DRAWN FROM A MAIN FLOW

(75) Inventors: Farid Mazzouji, Vourey (FR); Monique Traversaz, Gieres (FR)

(73) Assignee: Alstom Hydro France, Levallois Perret (FR)

(*) Notice: Subject to any disclaimer, the term of this patent is extended or adjusted under 35 U.S.C. 154(b) by 637 days.

(21) Appl. No.: 12/452,821

(22) PCT Filed: Jul. 23, 2008

(86) PCT No.: PCT/FR2008/051386
§ 371 (c)(1),
(2), (4) Date: Jan. 25, 2010

(87) PCT Pub. No.: WO2009/016316
PCT Pub. Date: Feb. 5, 2009

(65) Prior Publication Data
US 2010/0129200 A1    May 27, 2010

(30) Foreign Application Priority Data

Jul. 23, 2007  (FR) ...................................... 07 05332

(51) Int. Cl.
*F03B 11/04*  (2006.01)
(52) U.S. Cl.
USPC ......................................... 415/144; 415/202

(58) Field of Classification Search
USPC .................................................. 415/144, 202
See application file for complete search history.

(56) References Cited

U.S. PATENT DOCUMENTS

| 1,942,995 | A |   | 1/1934  | Biggs |
| 1,950,777 | A |   | 3/1934  | Biggs |
| 2,079,258 | A |   | 5/1937  | Logan |
| 4,355,949 | A | * | 10/1982 | Bailey ............................ 415/35 |
| 4,372,113 | A | * | 2/1983  | Ramer ............................ 60/325 |
| 7,927,064 | B2 | * | 4/2011 | Talya et al. ........................ 415/1 |
| 2005/0220605 | A1 | * | 10/2005 | Talya et al. ....................... 415/1 |
| 2010/0129200 | A1 | * | 5/2010  | Mazzouji et al. ............. 415/116 |

FOREIGN PATENT DOCUMENTS

| DE | 1187559 B       | 2/1965  |
| DE | 1528821 A1      | 10/1969 |
| JP | 05 005478 A     | 1/1993  |
| WO | WO 2005/103486 A1 | 11/2005 |

* cited by examiner

*Primary Examiner* — Edward Look
*Assistant Examiner* — Christopher R Legendre
(74) *Attorney, Agent, or Firm* — Dowell & Dowell, PC

(57) ABSTRACT

A Pelton hydraulic machine through which a main flow of water passes including at least one Pelton turbine manifold with at least a turbulent zone or a reduced-pressure zone being formed close to the manifold and wherein a secondary flow drawn from the main flow, and unaltered in relation to the main flow, is injected into the turbulent or reduced-pressure zone so as to alter the main flow locally or increase the pressure in the zone.

4 Claims, 1 Drawing Sheet

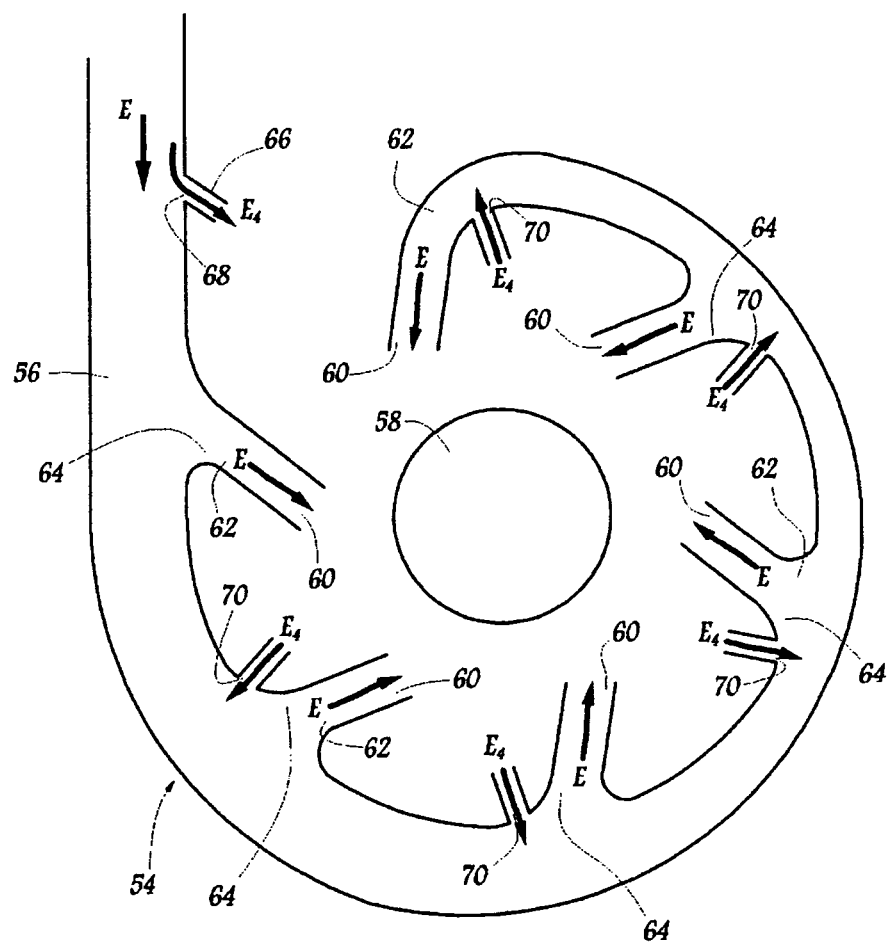

PELTON HYDRAULIC MACHINE INCLUDING MEANS FOR INJECTING A FLOW DRAWN FROM A MAIN FLOW

BACKGROUND OF THE INVENTION

1. Field of the Invention

The present invention relates to a Pelton type hydraulic machine of the type traversed by a main flow of water, comprising at least one manifold of a Pelton turbine, in the vicinity of which is formed at least one eddy zone or a reduced-pressure zone.

2. Brief Description of the Related Art

Such a hydraulic machine is used, for example, in a plant for producing hydroelectricity. The machine is installed in the path of the current or is supplied with water from a reservoir into which one or more water courses are discharged.

In these hydraulic machines, there are zones in which the main flow traversing the machine is disturbed and forms eddies or exhibits a reduced pressure, because of the configuration of the machine. Such zones disrupt the general performance of the hydraulic machine because they reduce the efficiency of action of the main flow in the hydraulic machine or cause problems of operation of the hydraulic machine.

SUMMARY OF THE INVENTION

One of the objects of the invention is to alleviate these drawbacks by proposing a Pelton type hydraulic machine making it possible to eradicate the eddy or reduced-pressure zones.

Accordingly, the invention relates to a Pelton type hydraulic machine of the aforementioned type, comprising means for injecting a flow tapped from the said main flow, not modified relative to the main flow, in the said eddy or reduced-pressure zone so as to locally modify the main flow or increase the pressure in this zone.

The injection of a flow tapped from the main flow into the eddy or reduced-pressure zones makes it possible to effectively make up for the lack of performance of the action of the main flow in these zones, which improves the performance and the behaviour of the hydraulic machine.

According to other features of the hydraulic machine:

the injection means comprise at least one duct comprising an inlet tapping off a flow from the main flow upstream of the manifold and an outlet opening into the eddy or reduced-pressure zone, the injection means comprise a valve placed in the path of the tapped flow, the said valve being able to be moved between an open position in which it allows the tapped flow to pass from the main flow and a closed position in which it prevents the passage of the tapped flow, the movement of the valve is controlled by suitable control means, the eddy or reduced-pressure zone is formed in the vicinity of the bifurcations of the manifold, the injection means being arranged to tap off the tapped flow from the main flow upstream of the said bifurcations and to inject the tapped flow in the vicinity of the said bifurcations.

BRIEF DESCRIPTION OF THE DRAWINGS

Other aspects and advantages of the invention will appear during the following description, given as an example and made with reference to the appended drawing in which:

FIG. 1 is a schematic representation in section of a Pelton turbine according to the invention.

DESCRIPTION OF THE PREFERRED EMBODIMENTS

The invention described below applies to a hydraulic machine of the Pelton turbine type. Since this machine is known, it is not to be described in detail in the present description. The invention also applies to other types of hydraulic machines in which problems of the formation of eddy or reduced-pressure zones occur.

In the description, the terms "upstream" and "downstream" are defined with respect to the direction of flow of the main flow E traversing the hydraulic machine.

A Pelton turbine 54 has been shown schematically in FIG. 1.

The Pelton turbine 54 comprises at least one manifold 56 rotating a rotor 58 by means of a main flow E flowing in the manifold 56 and injected towards the rotor 58 via injection zones 60. The manifold 56 surrounds the rotor and the injection zones 60 protrude from the manifold 56 towards the rotor 58 via bifurcations 62, as shown in FIG. 6 and in a known manner.

Eddy zones 64 and reduced pressure zones are created in the vicinity of each bifurcation 62 which affects the performance of the Pelton turbine.

In order to alleviate this drawback, the manifold 56 comprises means for injecting a flow $E_4$, tapped off from the main flow E upstream of the bifurcation 62, into the zones 64 in the vicinity of the bifurcations 62. The injection means comprise for example one or more ducts 66 (partially shown) comprising an inlet opening leading into the manifold 56 upstream of the bifurcations 62 and an outlet opening 70 leading to the vicinity of the bifurcations 62, for example upstream of the latter. The inlet opening 68 taps off the flow $E_4$ from the main flow E and the duct 66 conveys this tapped flow $E_4$ to the outlet opening 70 where the tapped flow $E_4$ is injected into the zones 64. The flow $E_4$ makes it possible to modify the main flow E in the zones 64 in order to homogenize the latter in the injection zones 60.

According to an embodiment that can be applied, the injection means comprise a valve (not shown) placed in the path of the tapped flow. The valve can be moved between an open position in which it allows the tapped flow to pass and a closed position in which it prevents the passage of the tapped flow. The valve is for example placed in the vicinity of each inlet opening of the injection means and makes it possible manually or automatically to control the injection of the tapped flow.

The movement of the valve is controlled by control means (not shown) which are mechanical or electric in a manner known per se. Therefore, during operating conditions of the hydraulic machine causing the formation of eddy or reduced-pressure or cavitation zones, an automatic system or an operator of the machine switches the valve(s) to the open position which makes it possible to inject the tapped flow in the said zones and to prevent the formation of these zones, as described above.

It should be noted that the tapped flow is not modified relative to the main flow E, that is to say that the water does not sustain any operation to modify its composition during the tapped flow.

The invention claimed is:

1. A Pelton type hydraulic machine through which flows a main flow (E) of water, the hydraulic machine comprising at least one manifold of a Pelton turbine, the at least one manifold having bifurcations, and wherein an eddy zone or a reduced-pressure zone is formed in the vicinity of each bifurcation; injection means for injecting a tapped flow ($E_4$), tapped from the main flow upstream of the bifurcations in a manner such that the tapped flow is not modified relative to the main flow (E), into the vicinity of the bifurcations so as to locally modify the main flow (E) or increase the pressure in the eddy or reduced pressure zones.

2. The hydraulic machine according to claim 1, wherein the injection means includes at least one duct having an inlet tapping off the tapped flow ($E_4$) from the main flow (E) upstream of the at least one manifold and an outlet opening into the eddy or reduced-pressure zone adjacent each bifurcation.

3. The hydraulic machine according to claim 2, wherein the injection means includes a valve placed in a path of the tapped flow ($E_4$), the valve being able to be moved between an open position in which it allows the tapped flow ($E_4$) to pass from the main flow (E) and a closed position in which it prevents the passage of the tapped flow ($E_4$).

4. The hydraulic machine according to claim 3, wherein the movement of the valve is controlled by control means.

* * * * *